INVENTORS
HERSCHEL V. GIBSON
ELMER E. CASEY, deceased.
By CORA MAY CASEY, Executrix Sept. 23, 1947. H. V. GIBSON ET AL 2,427,958
RAMP FOR DISPENSING APPARATUS
Original Filed Oct. 19, 1939  3 Sheets-Sheet 3

INVENTORS
HERSCHEL V. GIBSON
ELMER E. CASEY, deceased
By CORA MAY CASEY, Executrix By Thiess, Olson & Mecklenburger
Attys.

Patented Sept. 23, 1947

2,427,958

UNITED STATES PATENT OFFICE 2,427,958

RAMP FOR DISPENSING APPARATUS

Herschel V. Gibson, Bloomington, Ill., and Elmer E. Casey, deceased, late of Bloomington, Ill., by Cora May Casey, executrix, Bloomington, Ill., assignors, by mesne assignments, to Eureka Williams Corporation, a corporation of Michigan Original application October 19, 1939, Serial No. 300,109, now Patent No. 2,315,515, dated April 6, 1943. Divided and this application January 6, 1943, Serial No. 471,430

3 Claims. (Cl. 193—38)

This invention relates to a ramp structure for a dispensing apparatus adapted to contain and dispense packaged liquid goods, such as bottled milk or the like, which require a cool temperature to prevent spoiling.

This is a division of a prior application, Serial No. 300,109, filed October 19, 1939, and issued April 6, 1943, as Patent No. 2,315,515, in the name of Herschel V. Gibson and Elmer E. Casey. This prior application discloses a cooling and dispensing apparatus comprising a cabinet having a storage chamber with a discharge opening and a plurality of inclined ramps disposed side by side for supporting and advancing containers by gravity to the discharge opening.

Each of the ramps comprises lateral supports and a plurality of longitudinally extending members carried by the supports for directing the containers to the dispensing means adjacent the discharge opening. It will be understood that the ramps of the present invention are adapted for use in connection with any suitable dispensing means; however, the dispensing means of the above identified prior application comprises a rotary member having at least one longitudinally extending pocket for each ramp to receive containers therefrom. The pockets are staggered in a lateral direction in the path of the containers for dispensing the containers one at a time out of the discharge opening. A gravity-weighted member is normally supported in one position by the containers for controlling the normal operation of a coin-controlled means for operating the dispenser to deliver one of the containers at a time.

The present invention is directed to the inclined ramps for supporting and advancing the containers by gravity to the discharge opening. These ramps comprise laterally and substantially horizontally extending supports and a plurality of longitudinally extending members carried by the supporting means and in laterally spaced relationship.

The longitudinal members are non-uniform in height and are adapted to engage a main body portion of substantially uniform cross section of the containers for support thereof in a tilted position.

It is an object of this invention to provide a ramp of the character described, which ramp is particularly adapted to prevent accidental endwise or other abnormal displacement of a container during its movement over the ramp.

It is also an object to provide a ramp wherein the containers are advanced to the discharge opening by gravity and in a tilted position.

A further object is to provide a dispensing ramp which is comparatively inexpensive in construction, simple and efficient in operation and which will not easily get out of order.

Other objects and advantages of this invention will hereinafter be more particularly pointed out, and for a more complete understanding of the characteristics of this invention, reference may now be had to the following description and the accompanying drawings.

Figure 1:
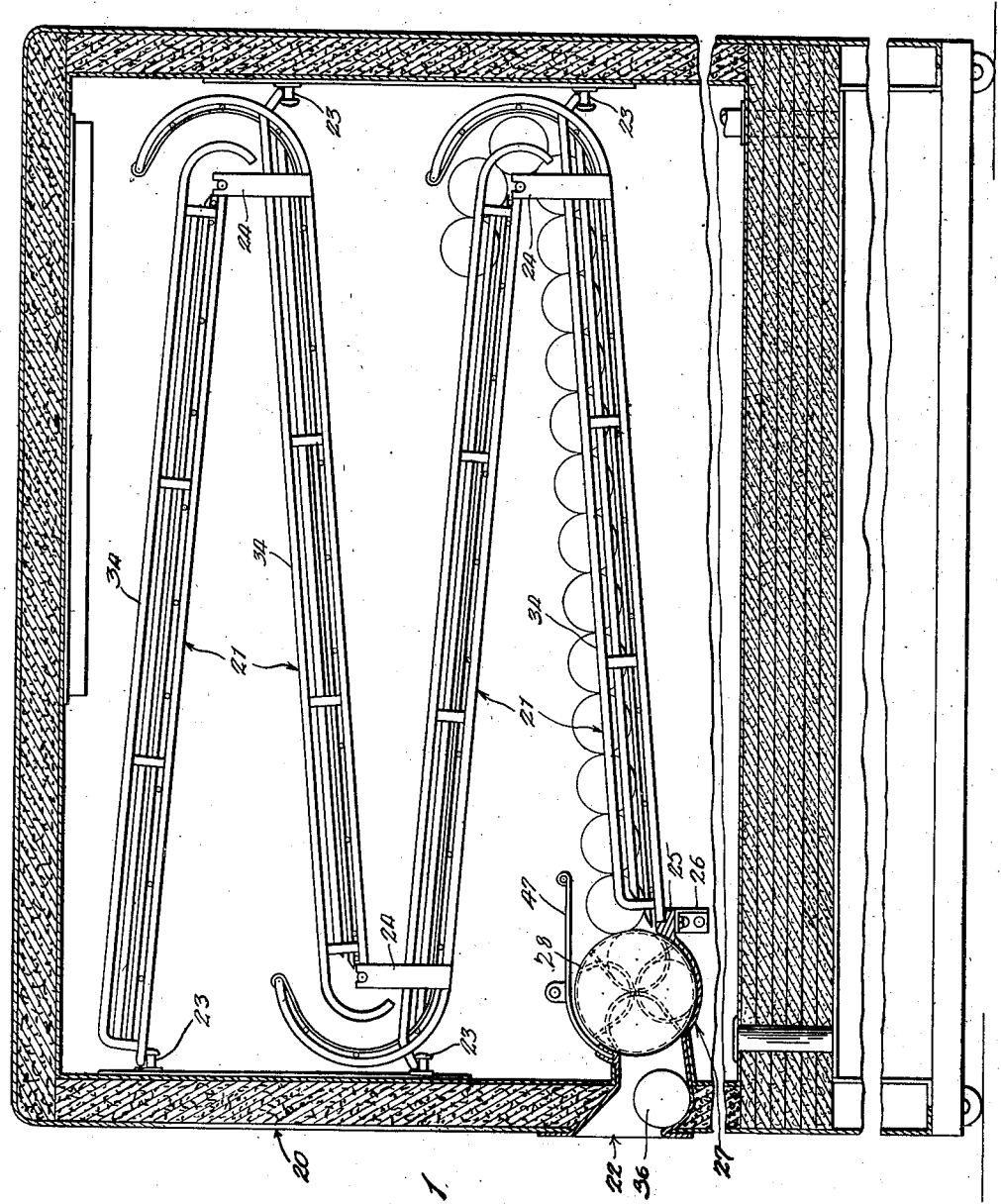
Fig. 1 is a transverse vertical sectional view through a dispensing apparatus, one embodiment of the ramp being shown in side elevation.

Referring to the drawings in detail, the embodiment shown in Fig. 1 comprises a cabinet 20 in the form of a substantially rectangular box enclosing a storage chamber for containers. The cabinet is preferably provided with a removable top and the walls and top may be suitably insulated, as shown.

Since the dispensing apparatus is designed primarily for storing and dispensing such liquids as milk, soft drinks and the like, which are contained in generally cylindrical containers, and since it is desirable to keep these containers at a low temperature, suitable refrigerating apparatus (not shown) may be housed in the cabinet for cooling the storing chamber.

A plurality of inclined ramps 21 are disposed side by side in the cabinet and preferably in superposed relation, so that containers may progress by gravity over the inclined surfaces of the ramps from one ramp to the ramp below, the last ramp communicating with a discharge opening 22. One end of each ramp rests on pins 23 or other suitable supports extending from the inner walls of the cabinet, the other end of the ramp being detachably supported in cradles or arms 24 secured on the next adjacent ramp with the exception of the lower ramp, which latter is supported on a cross bar 25 secured to angle iron members 26. The angle irons are fastened to the opposed side walls of the cabinet. The cross bar 25 may form a part of a housing 27 having a dispensing means 28, the housing communicating with a discharge opening 22.

Figure 2:
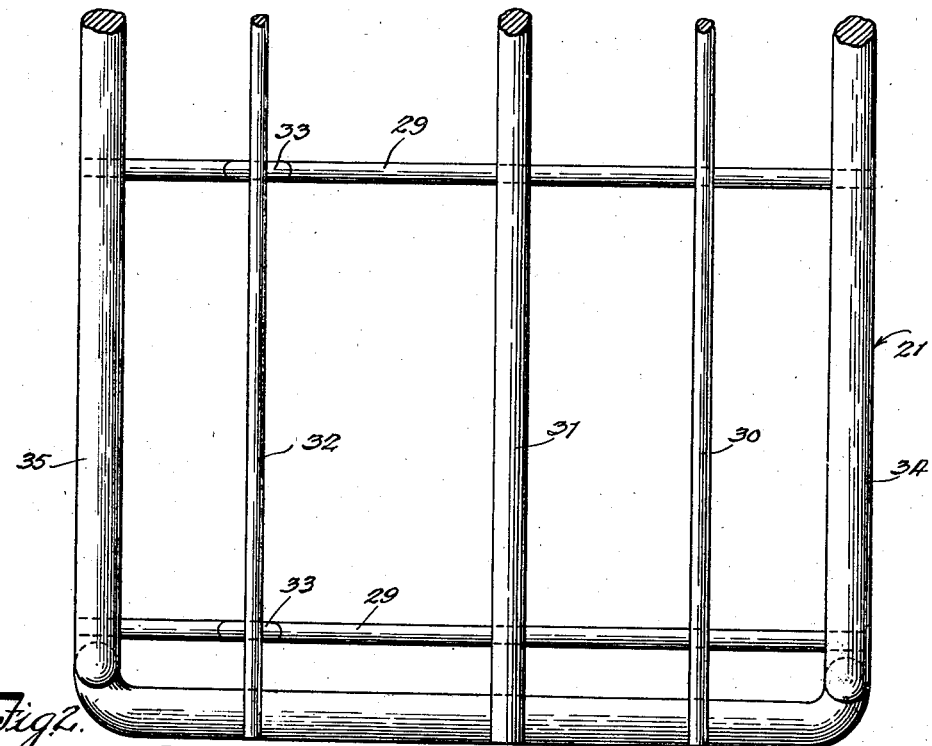
Fig. 2 is a fragmentary top view of the end of one of the ramps illustrated in Fig. 1.
Figure 3:
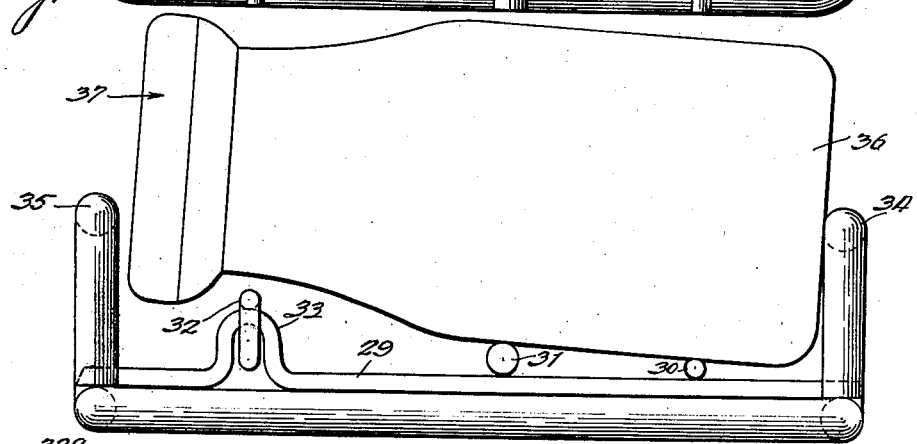
Fig. 3 is an elevational view of the embodiment shown in Fig. 2, and illustrates a container in position thereon.

Referring now more particularly to Figs. 2 and 3 of the drawings, each of the ramps 21 comprises a plurality of spaced laterally and substantially horizontally extending supporting means in the form of strips of wire or rod 29 for supporting a plurality of longitudinally extending members disposed thereon in laterally spaced relation. The intermediate longitudinally extending members 30 and 31 are of nonuniform height or diameter and the other intermediate longitudinally extending member 32 is of small diameter; however, the member 32 is raised above the height of the members 30 and 31 by reason of the support thereof on loop portions 33 of the laterally extending members 29. The side members 34 and 35 are raised a substantial distance above the plane of the intermediate members for guiding the container and preventing endwise displacement thereof from the rack, the member 34 being engaged by the bottom of the container as the container is tilted in position thereagainst.

The container 36 has a cylindrical main body portion of substantially uniform cross section and an extending reduced neck having a head with a removable closure cap 37 thereon. The lateral members 29 support the intermediate longitudinally extending members or tracks 30 and 31 and since the latter members are of different diameters and engage the main body portion of the container 36, the container is tilted from a horizontal position in the direction of the side member or rail 34. The tilting of the container 36 to rest against the side member 34 of the ramp prevents contacting engagement of the removable closure cap against the side rail 35 and since it is desired that the removable closure cap should not strike against any fixed object, the intermediate longitudinally extending member 32 is positioned to resist any tendency for the container to tilt in a direction opposite to its normal tilted position.

Figure 4:
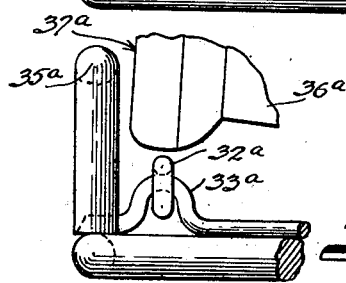
Fig. 4 is a view similar to Fig. 3 of a fragmentary portion of a modified form of ramp construction for use in the apparatus of Fig. 1.

Referring now more particularly to Fig. 4 of the drawings, the side rail 35a corresponding to the side rail member 35 of the previously described embodiment is not normally contacted by the closure cap end of the container 36a and when desired, the loop 33a may support the intermediate longitudinally extending wire 32a in a position adjacent the closure cap 37a rather than adjacent the reduced neck of the container, as shown in Fig. 3. The longitudinally extending member 32a prevents the accidental tilting of the container from its normally tilted position.

Figure 5:
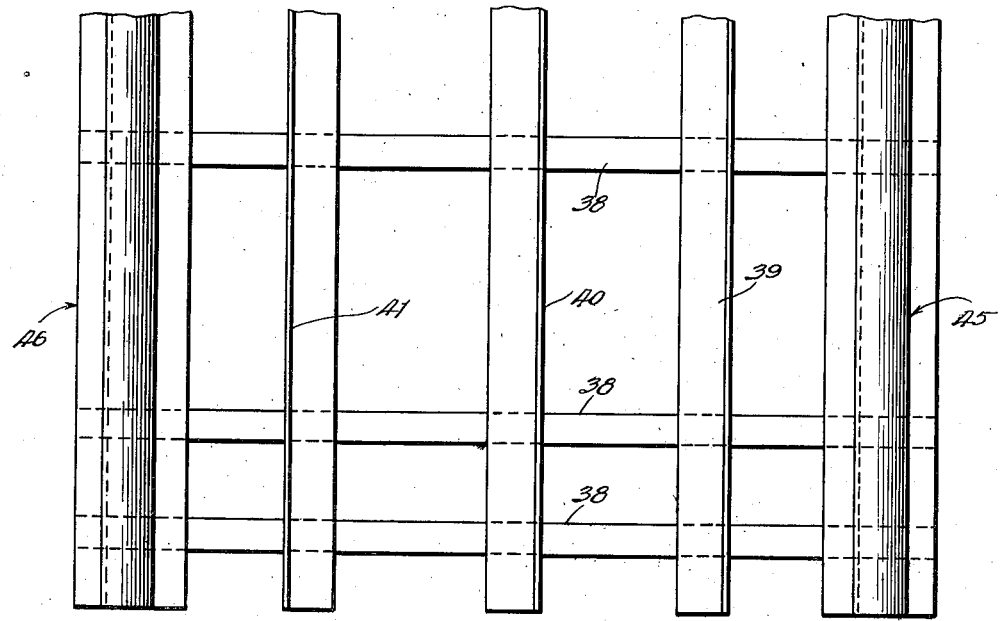
Fig. 5 is a view similar to Fig. 2 and discloses a portion of a similar ramp, but formed of a different type of material.
Figure 6:
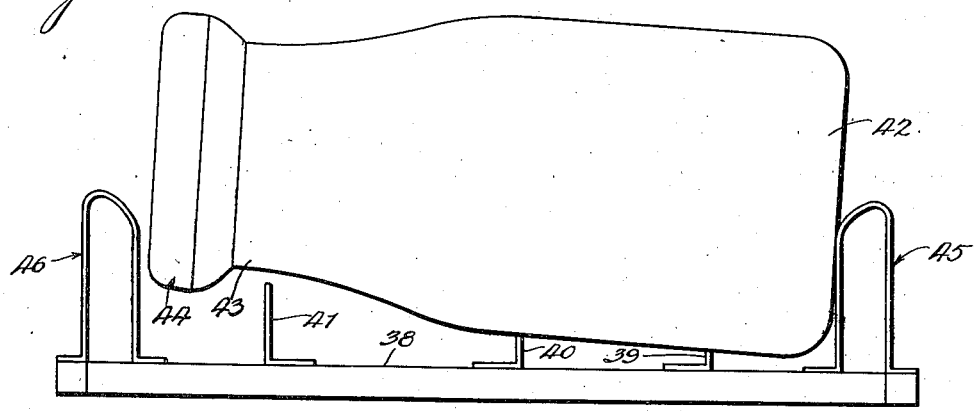
Fig. 6 is an end elevational view of the ramp shown in Fig. 5 and illustrates a container supported thereon.

Referring to Figs. 5 and 6 of the drawings, the embodiment shown therein comprises laterally and substantially horizontally extending supporting means 38 preferably formed of square wire or rod for supporting a plurality of longitudinally extending members in laterally spaced relation. The intermediate members 39 and 40 are preferably formed of strips of sheet metal bent into L-shape, the base of the strips being soldered, welded or otherwise secured to the laterally extending supporting rods 38. The upwardly extending flanges are of nonuniform height, that is, the upwardly extending portion of the strip 39 is of less height than the corresponding flange of the strip 40. The other intermediate strip 41 is similarly formed of a strip of sheet metal bent into L-shape with the base portion thereof soldered, welded or otherwise secured to the laterally extending supporting means 38 and the upwardly extending flange is of a substantially greater height than the corresponding flanges of the strips 39 and 40.

The container 42 is of the type having a body portion of a substantially uniform cross section and an extending reduced neck 43 with a removable closure cap 44 on the head thereof. Such a container is ordinarily employed for holding milk, and the closure cap may be formed of cardboard or heavy paper. The intermediate strips 39 and 40 are so disposed as to engage the main body portion of a container for support thereof, and since the upwardly extending flanges of the intermediate members 39 and 40 are of nonuniform height, the container is tilted from the plane of the horizontal. The intermediate member 41 is disposed adjacent the neck portion 43 of the container although preferably not in contact therewith during the normal travel of the container along the intermediate strips 39 and 40. However, the member 41 is so positioned that it prevents the accidental tilting of the container in the direction opposite to its normal tilted position.

Longitudinally extending side strips or rails 45 and 46 are also supported by the laterally extending supporting means 38. The strips 45 and 46 each comprising a strip of sheet metal are bent into inverted substantially U-shaped cross section having laterally extending feet, which latter are welded, soldered or otherwise secured to the supporting means. The bottom of the container 42 engages an arcuate portion of the strip 45 in line contact therewith to prevent endwise displacement of the container 42 from the strips 39 and 40. The strip 46 does not normally contact the closure cap 44, there being clearance therebetween, but acts to prevent accidental endwise displacement of the container from the strips 39 and 40 in the other direction.

Figure 7:
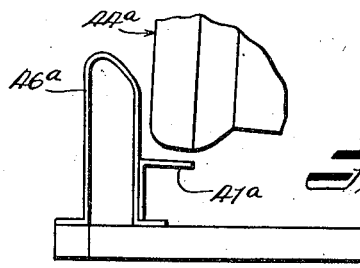
Fig. 7 is a view similar to Fig. 6, the ramp being formed of a different material.

The embodiment of the invention shown in Fig. 7 is similar in all respects to that shown in Figs. 5 and 6 with the exception that the strip 41a of L-shaped cross section is disposed adjacent the rail 46a and under the closure cap 44a instead of adjacent the reduced neck portion as in the previously described embodiment. The strip 41a has the same function as the strip 41 in the previously described embodiment in preventing the tilting of the container in the opposite direction from its normally tilted position, except that any accidental engagement is directed against the closure cap instead of against the reduced neck of the container.

In the operation of the dispensing mechanism, the containers are fed by gravity along the inclines of the ramps 21 to a position adjacent the dispensing means 28. As shown in Fig. 1, each container is directed into a pocket of the dispensing device as the pocket comes into alignment therewith, and, upon the deposit of a coin, a quarter revolution of the dispensing cylinder discharges a container from one of the pockets to the discharge opening, the pocket being inclined to permit the container to roll by gravity therefrom onto an inclined surface of the discharge opening 22.

Should the weight of the containers behind that container entering the pocket of the dispensing means be so great as to tend to stack the containers on top of each other, it is desirable to provide a substantially rigid means 47 above the adjacent container and extending over the end of the ramp in spaced relation therewith to permit passage of the containers therebetween and to prevent stacking of the containers. One container is delivered from one of the ramps while a container from an adjacent ramp is in position to be delivered upon the next operation, the pockets of the dispensing mechanism being staggered in a lateral direction.

It is intended, of course, that the invention should not be limited to the specific embodiment or embodiments disclosed or to the exact details of construction shown, as obvious modifications will occur to persons skilled in the art.

Having thus described this invention, what is claimed and desired to be secured by Letters Patent is:

1. A ramp for bottles or the like containers having reduced neck portions, comprising an elongated base having side rails, a pair of spaced longitudinal track members between said side rails and of different heights to support said containers in a tilted position by engagement with the large diameter portions of said containers with the bottom ends of said containers engaged against the adjacent side rail so that the neck ends are tilted upwardly, and a longitudinal track member of greater height than said pair of track members and positioned under but out of engagement with the neck portions of said containers and of sufficient height to prevent accidental tilting of said containers in a direction opposite to their normal tilted position.

2. A ramp for a rollable container having a surface of revolution comprising an elongated inclined track means on which the container rolls, supporting the container with its axis in inclined position whereby the container tends to gravitate longitudinally of its axis, and elongated guide means engaged by the end of the container as it rolls, located on the side of the track means toward which the container tends to gravitate for preventing axial movement of the container under said tendency to gravitate axially, said track means having track portions engaging a rolling container at circumferences thereof spaced axially a substantial distance and of substantially equal diameters, said container having a cylindrical portion of less diameter than said circumferences and safety guide means spaced from said reduced portion but engageable thereby to limit any accidental tilting action of said container as it rolls.

3. A ramp for a rollable container having a surface of revolution comprising an elongated inclined track means on which the container rolls, supporting the container with its axis in inclined position whereby the container tends to gavitate longitudinally of its axis, and elongated guide means engaged by the container as it rolls for preventing axial movement of the container under said tendency to gravitate axially, said track means having track portions engaging a rolling container at circumferences thereof spaced axially a substantial distance and of substantially equal diameters, said container having a cylindrical portion of less diameter than said circumferences and safety guide means spaced from said reduced portion but engageable thereby to limit any accidental tilting action of said container as it rolls.

HERSCHEL V. GIBSON.
CORA MAY CASEY,
*Executrix of the Estate of Elmer E. Casey, Deceased.*

REFERENCES CITED

The following references are of record in the file of this patent:

UNITED STATES PATENTS

| Number | Name | Date |
| --- | --- | --- |
| 388,251 | Bower | Aug. 21, 1888 |
| 707,297 | Brink | Aug. 19, 1902 |
| 979,814 | Westerbeck | Dec. 27, 1910 |
| 1,004,998 | Crecelius | Oct. 3, 1911 |
| 1,153,991 | Wood | Sept. 21, 1915 |
| 2,150,469 | Tozer | Mar. 14, 1939 |
| 2,210,653 | Dennis | Aug. 6, 1940 |
| 2,252,493 | Dennis | Aug. 12, 1941 |
| 2,260,643 | Rosan | Oct. 28, 1941 |